(12) United States Patent
Winner et al.

(10) Patent No.: US 6,678,602 B2
(45) Date of Patent: Jan. 13, 2004

(54) METHOD FOR REGULATING THE SPEED OF A VEHICLE

(75) Inventors: Hermann Winner, Karlsruhe (DE); Jens Lueder, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,151

(22) PCT Filed: Mar. 31, 2001

(86) PCT No.: PCT/DE01/01280
§ 371 (c)(1),
(2), (4) Date: Jun. 21, 2002

(87) PCT Pub. No.: WO01/79014
PCT Pub. Date: Oct. 25, 2001

(65) Prior Publication Data
US 2002/0165657 A1 Nov. 7, 2002

(30) Foreign Application Priority Data

Apr. 14, 2000 (DE) .......................................... 100 18 557

(51) Int. Cl.[7] .......................... B60K 31/00; G01C 22/00
(52) U.S. Cl. ............................ 701/93; 701/70; 180/170
(58) Field of Search .............................. 701/70, 79, 93, 701/96, 110, 121, 301; 180/170, 197

(56) References Cited

U.S. PATENT DOCUMENTS

| 5,454,442 | A | * | 10/1995 | Labuhn et al. ............... 180/169 |
| 5,734,344 | A | * | 3/1998 | Yamada ........................ 342/72 |
| 5,761,630 | A | * | 6/1998 | Sekine et al. ................ 701/301 |
| 6,138,062 | A | * | 10/2000 | Usami .......................... 701/23 |
| 6,273,204 | B1 | * | 8/2001 | Winner et al. ............... 180/170 |
| 6,311,117 | B1 | * | 10/2001 | Winner et al. ................ 701/93 |

FOREIGN PATENT DOCUMENTS

| DE | 42 42 700 | 6/1994 |
| DE | 195 30 065 | 1/1997 |
| DE | 197 22 947 | 2/1999 |
| DE | 197 36 964 | 3/1999 |
| DE | 199 19 888 | 11/1999 |
| EP | 0 798 150 | 10/1997 |
| WO | 99 28144 | 6/1999 |

OTHER PUBLICATIONS

Von Fritz Ackermann, Abstandsregelung mit Radar, [Distance Control Using Radar], Spektrum der Wissenschaft, Ed. 6/80, pp. 24–34.

* cited by examiner

Primary Examiner—Tan Q. Nguyen
Assistant Examiner—Dalena Tran
(74) Attorney, Agent, or Firm—Kenyon & Kenyon

(57) ABSTRACT

In a method of controlling the speed of a vehicle, at least one vehicle traveling ahead in the same lane within a radar detection range is detected using a radar sensor and in which the transverse acceleration in the vehicle to be controlled is detected. Acceleration or a change in acceleration is limited in the vehicle to be controlled if, in addition to or instead of a transverse acceleration, it is evaluated that the vehicle to be controlled has reached the limit of the radar detection range and/or the vehicle traveling ahead has left the radar detection range when no change of lanes takes place.

1 Claim, 1 Drawing Sheet

METHOD FOR REGULATING THE SPEED OF A VEHICLE

FIELD OF THE INVENTION

The present invention relates to a method of controlling the speed of a vehicle, in particular as a function of a vehicle traveling ahead in the same lane.

BACKGROUND INFORMATION

It is known, for example, from German Patent No.197 22 947, that the vehicle traveling ahead can also be detected taking into consideration the course of the road, e.g., in curves, basically via signals produced by a sensor, e.g., a radar sensor.

In addition, it is known from German Patent Application No. 42 42 700 that a radar sensor for detecting a vehicle traveling ahead can be mounted on a vehicle. This radar sensor is, e.g., a component of an ACC (adaptive cruise control) vehicle comfort system, in which information regarding the distance and relative speed of the vehicle with respect to other vehicles and to the road conditions is processed on an ongoing basis.

For example, an FMCW (frequency modulated continuous wave) radar, having both the transmission technology with an antenna system for generating the radar beams and a receiver with analysis electronics, is mounted in the outside front area of the vehicle in a manner known from German Patent Application No. 195 30 065. A multibeam method according to German Patent Application No. 195 30 065 also allows the lateral position of objects, e.g., vehicles in a curve, to be determined.

The aforementioned speed controlling in an ACC system takes place so that the travel speed is adjusted to slower vehicles traveling ahead if these are measured by the radar distance sensor with limited detection range and are located in the area of the vehicle's expected path. Traveling along a curve represents a particularly critical situation for the response of the system, since, on the one hand, the predefined desired speed may be too high for traveling along a curve and, on the other hand, the area detected by the radar sensor is limited in the curve, and therefore vehicles traveling ahead are detected with a delay, which may result in critical closeness.

It is also known, for example, from the journal article "Abstandsregelung mit Radar" [Distance control using radar], F. Ackermann, Spektrum der Wissenschaft, Ed. 6/80, pp. 24–34, that the lane or the path can be predicted using the vehicle's own sensors already provided for other purposes. For example, the yaw rate detected using an appropriate sensor, i.e., the angular velocity of the vehicle about its vertical axis, or the transverse acceleration acting on the ACC vehicle can be evaluated in order to limit the speed. In this way, however, a curve is not detected until the vehicle is in the curve, so that it is too late to meaningfully predict the vehicle's path. In particular, speed control relative to vehicles traveling on adjacent lanes must also be prevented in this case at the beginning of a curve.

SUMMARY OF THE INVENTION

A method of controlling the speed of a vehicle in which at least one vehicle traveling ahead in the same lane within the detection range of a radar is detected using a radar sensor and in which the transverse acceleration in the vehicle to be controlled is detected is advantageously refined according to the present invention.

Acceleration or a change in acceleration is limited in a simple manner in the vehicle to be controlled if, in addition to or instead of a transverse acceleration, information on the vehicle reaching the limits of the radar detection range and/or on the vehicle traveling ahead leaving the radar detection range is evaluated when no change of lanes takes place. The present invention advantageously ensures reliable operation of the above-mentioned ACC system in curves. This is possible by combining the aforementioned different approaches, which prevent uncomfortable or undesired acceleration before or in curves.

Thus, according to the present invention, the acceleration or change in acceleration in a curve in the presence of a transverse acceleration not yet approaching the acceleration limit in the ACC vehicle is limited as a function of the limited radar sight range. The radar sight range results from the geometric relationships between the course of the road and the radar detection range of the radar sensor on the ACC vehicle. One criterion for determining the acceleration limitation is the time period ($T_{Range}$) until the ACC vehicle has reached the lateral limit ($\alpha_{Range}$) of the radar detection range. From this point on, objects farther away, traveling in their own lanes, can no longer be detected by the radar sensor due to the course of the road, which may result in dangerous closeness to vehicles traveling ahead.

It is furthermore particularly advantageous if the acceleration limitation becomes stronger as the radar detection range becomes shorter measured in units of time.

When operating the ACC system, the problem may also arise that when or before the ACC vehicle enters a curve, the vehicle traveling ahead, which is already in the curve, is lost as the target object because it has left the radar detection range, while the ACC vehicle has not yet reached the actual curve area. This kind of target object loss can therefore be detected, when no change of lanes takes place, if the target object is on the path of the ACC vehicle until the target object is lost and is not assigned to an adjacent lane.

Also in this case, either the acceleration or the change in acceleration of the ACC vehicle can be limited after this type of target object loss has been recognized. The response time is of the order of magnitude of the actual time window for a target object loss and can be selected to be proportional to the latter.

DETAILED DESCRIPTION

Figure 1:
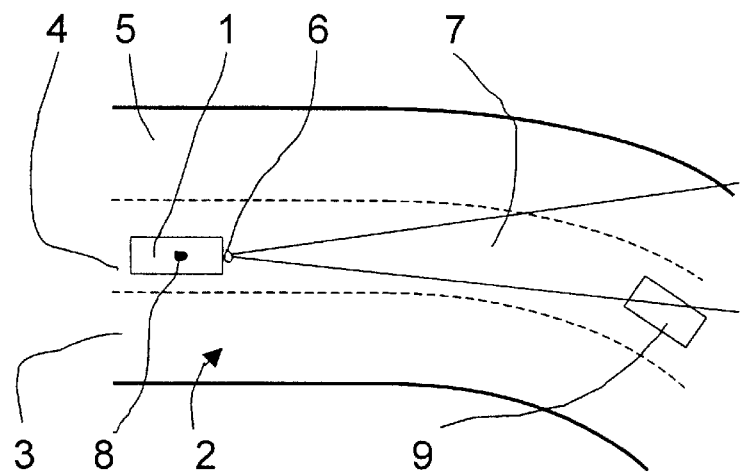
FIG. 1 illustrates the method according to the present invention for controlling the speed of a vehicle as a function of a vehicle traveling ahead in a curve in the same lane.

FIG. 1 shows an ACC vehicle 1 to be controlled, which is on a road 2 having lanes 3, 4, and 5. Vehicle 1 has a radar sensor 6 having a radar detection range 7 and an acceleration sensor 8 and is at a certain distance from a curve. A vehicle 9 traveling ahead on the same lane 4 of road 2 has already entered the curve and is just leaving radar detection range 7.

When there is sufficient transverse acceleration, the acceleration or the change in acceleration of ACC vehicle 1 can be limited in a circuit arrangement not explained in detail here, but known per se, using the signal of acceleration sensor 8 or a transverse acceleration determined from the steering wheel angle, the difference of wheel rotational speeds, or the yaw rate. As shown in FIG. 1, vehicle 1 has not yet, however, entered the curve, so that no transverse acceleration is present which would result in limitation. However, in order to prevent uncomfortable acceleration after the target object, i.e. vehicle 9 traveling ahead, is lost, this target object loss is evaluated in addition to the transverse acceleration itself and generates an appropriate signal for limiting the acceleration or change in acceleration of ACC vehicle 1.

Figure 2:
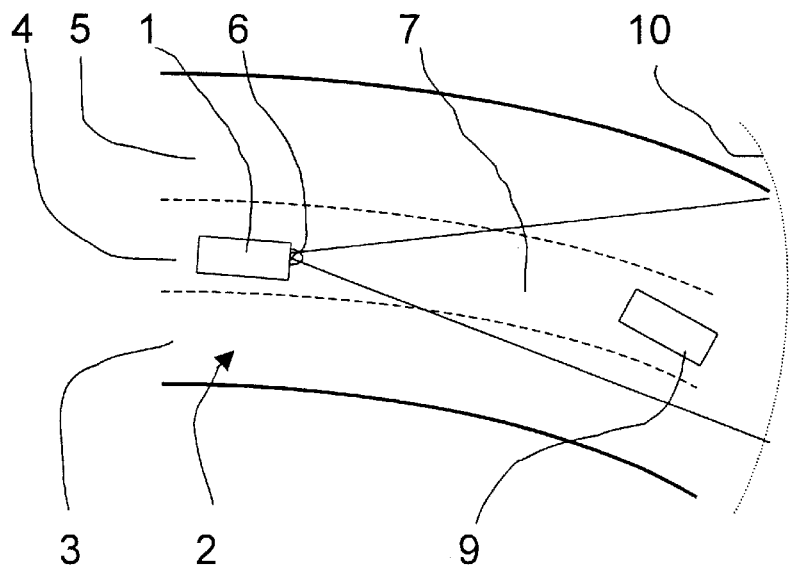
FIG. 2 further illustrates the method according to the present invention for controlling the speed of a vehicle as a function of a vehicle traveling ahead in a curve in the same lane.

FIG. 2 shows that, in contrast to the illustration of FIG. 1, vehicle 1 is already in the curve. In this case, a transverse acceleration which may not yet result in acceleration limitation in ACC vehicle 1 results in limitation as a function of radar sight range 10 reduced in width $d_{Range}$. Radar sight range 10 is the result of the geometric relationships between the course of road 2 and radar detection range 7 of radar sensor 6 on ACC vehicle 1. One criterion for determining the acceleration limitation is the time period $T_{Range}$ until ACC vehicle 1 reaches the lateral limit $\alpha_{Range}$ of radar detection range 7.

The following relationship applies:

$$T_{Range} \approx d_{Range}/V1 \approx 2*\alpha_{Range}/k*V1,$$

where k is the curvature of the curve (k=1/R) and V1 is the speed of vehicle 1.

What is claimed is:

1. A method for controlling a speed of a vehicle, comprising:

detecting, using a radar sensor, at least one vehicle traveling ahead in the same lane within a radar detection range;

measuring a transverse acceleration in the vehicle to be controlled;

determining whether at least one of (a) the vehicle to be controlled has reached a limit of the radar detection range and (b) the vehicle traveling ahead has left the radar detection range; and limiting one of an acceleration and a change in acceleration in the vehicle to be controlled if, in addition to or instead of a transverse acceleration, the at least one of (a) and (b) has been determined;

wherein a magnitude of the limitation of the one of the acceleration and the change in acceleration depends on a reduction of a radar sight range which results from a geometric relationship between a course of a road and the radar detection range; and wherein the geometric relationship includes the following relation:

$$T_{Range} \approx d_{Range}/V1 \approx 2*\alpha_{Range}/k*V1,$$

wherein:

$T_{Range}$ represents a time period until the vehicle to be controlled reaches a lateral limit of the radar detection range, $d_{Range}$ represents a width reduction of the radar sight range, V1 represents the speed of the vehicle to be controlled, $\alpha_{Range}$ represents the lateral limit of the radar detection range, and k represents a curvature of a curve of the road.

* * * * *